(12) United States Patent
Werjefelt et al.

(10) Patent No.: US 8,705,189 B2
(45) Date of Patent: Apr. 22, 2014

(54) EMERGENCY VISION APPARATUS WITH CLOSABLE HAND OPENING

(76) Inventors: Bertil R. L. Werjefelt, Kaneohe, HI (US); Alexander K. Werjefelt, Kaneohe, HI (US); Christian Werjefelt, Kaneohe, HI (US)

( * ) Notice: Subject to any disclaimer, the term of this patent is extended or adjusted under 35 U.S.C. 154(b) by 39 days.

(21) Appl. No.: 13/285,958

(22) Filed: Oct. 31, 2011

(65) Prior Publication Data

US 2013/0107388 A1    May 2, 2013

(51) Int. Cl.
*G02B 5/00* (2006.01)

(52) U.S. Cl.
USPC .......................................................... 359/894

(58) Field of Classification Search
USPC ........ 359/894; 244/118.5, 129.2; 229/125.02; 220/229, 495.01; 224/237; 248/99; 454/49; 435/307.1, 303.1, 809
See application file for complete search history.

(56) References Cited

U.S. PATENT DOCUMENTS

| | | | |
|---|---|---|---|
| 2,528,332 A | 10/1950 | Bergquist | |
| 2,695,605 A * | 11/1954 | Gibbon | 600/22 |
| 4,328,904 A | 5/1982 | Iverson | |
| 4,832,287 A | 5/1989 | Werjefelt | |
| 5,202,796 A * | 4/1993 | Werjefelt | 359/894 |
| 5,318,250 A | 6/1994 | Werjefelt | |
| 5,947,415 A | 9/1999 | Werjefelt | |
| 5,976,871 A * | 11/1999 | Walker et al. | 435/307.1 |
| 5,988,468 A | 11/1999 | Murdoch et al. | |
| 6,082,673 A | 7/2000 | Werjefelt | |
| 6,460,804 B2 | 10/2002 | Werjefelt | |
| 6,705,575 B1 | 3/2004 | Hoy | |
| 7,583,455 B2 | 9/2009 | Werjefelt | |
| 2005/0252923 A1 * | 11/2005 | Woolf | 220/731 |
| 2007/0012701 A1 * | 1/2007 | Amormino | 220/495.01 |
| 2009/0279196 A1 * | 11/2009 | Werjefelt | 359/894 |

FOREIGN PATENT DOCUMENTS

| | | |
|---|---|---|
| WO | WO 2009/082480 | 7/2009 |
| WO | WO 2009/137050 | 11/2009 |

OTHER PUBLICATIONS

VisionSafe Corporation, Maintenance and User Instruction Manual for EVAS Model 106 and 106-A, Revision 04, Jul. 10, 2009.

* cited by examiner

*Primary Examiner* — James Greece
*Assistant Examiner* — Jie Lei
(74) *Attorney, Agent, or Firm* — Shlesinger, Arkwright & Garvey LLP

(57) ABSTRACT

An emergency vision apparatus comprises an inflatable first enclosure, the first enclosure being made of airtight material and having an expanded form when deployed and a deflated form when not in use; and first and second clear members disposed at respective first and second ends of the first enclosure to enable a user to see through the first enclosure when expanded and observe a source of information at a distal end of the first enclosure while smoke or other particulate matter is in the environment. The first enclosure includes a closable opening configured for insertion of a user's hand to allow the user to operate a touch sensitive screen or hardware disposed in front of the first clear member; and a sealable closure for closing the opening and sealing the opening around the user's hand.

11 Claims, 9 Drawing Sheets

US 8,705,189 B2

EMERGENCY VISION APPARATUS WITH CLOSABLE HAND OPENING

FIELD OF THE INVENTION

The present invention relates generally to an apparatus to enable an operator to maintain visual contact with instruments or other visual sources of data after smoke and/or particulate from a fire or other sources has invaded the operator's environment. In particular, the present invention relates to an emergency vision apparatus that includes an inflatable enclosure that bridges the gap between a pilot and the windshield and/or instrument panel of an aircraft along the pilot's line of sight and provides a clear viewing path to the windshield and/or the instrument panel and access to manipulate touch sensitive displays, switches and other hardware, thereby providing him with vital information for guiding the aircraft to a safe landing after smoke and/or particulate matter invades the cockpit area.

BACKGROUND OF THE INVENTION

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5,318,250; 5,202,796; 5,947,415, 6,460,804 and 7,583,455, all issued to Bertil Werjefelt.

SUMMARY OF THE INVENTION

The present invention provides an emergency vision apparatus, comprising an inflatable first enclosure, the first enclosure being made of airtight material and having an expanded form when deployed and a deflated form when not in use; and first and second clear members disposed at respective first and second ends of the first enclosure to enable a user to see through the first enclosure when expanded and observe a source of information at a distal end of the first enclosure while smoke or other particulate matter is in the environment. The first enclosure includes a closable opening configured for insertion of a user's hand to allow the user to operate a touch sensitive screen or hardware disposed in front of the first clear member; and a sealable closure for closing the opening and sealing the opening around the user's hand.

DETAILED DESCRIPTION OF THE INVENTION

Figure 1:
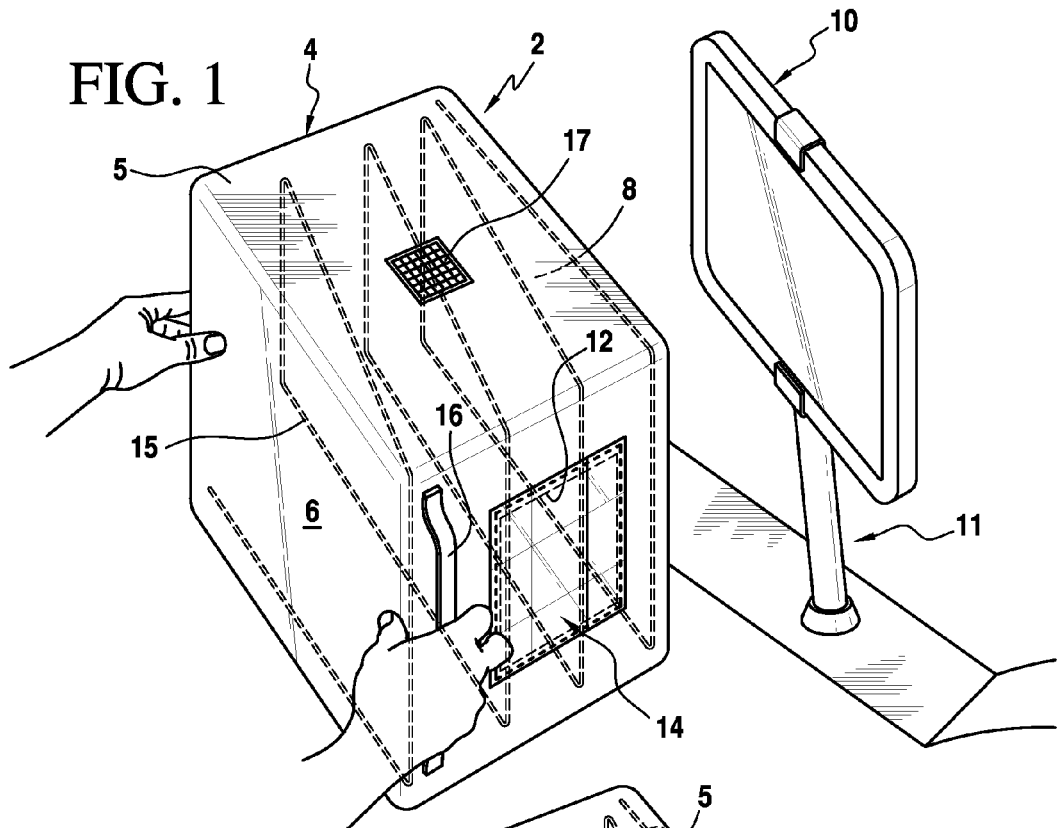
FIG. 1 is a perspective view of an emergency vision apparatus embodying the present invention, shown in an expanded form.
Figure 2:
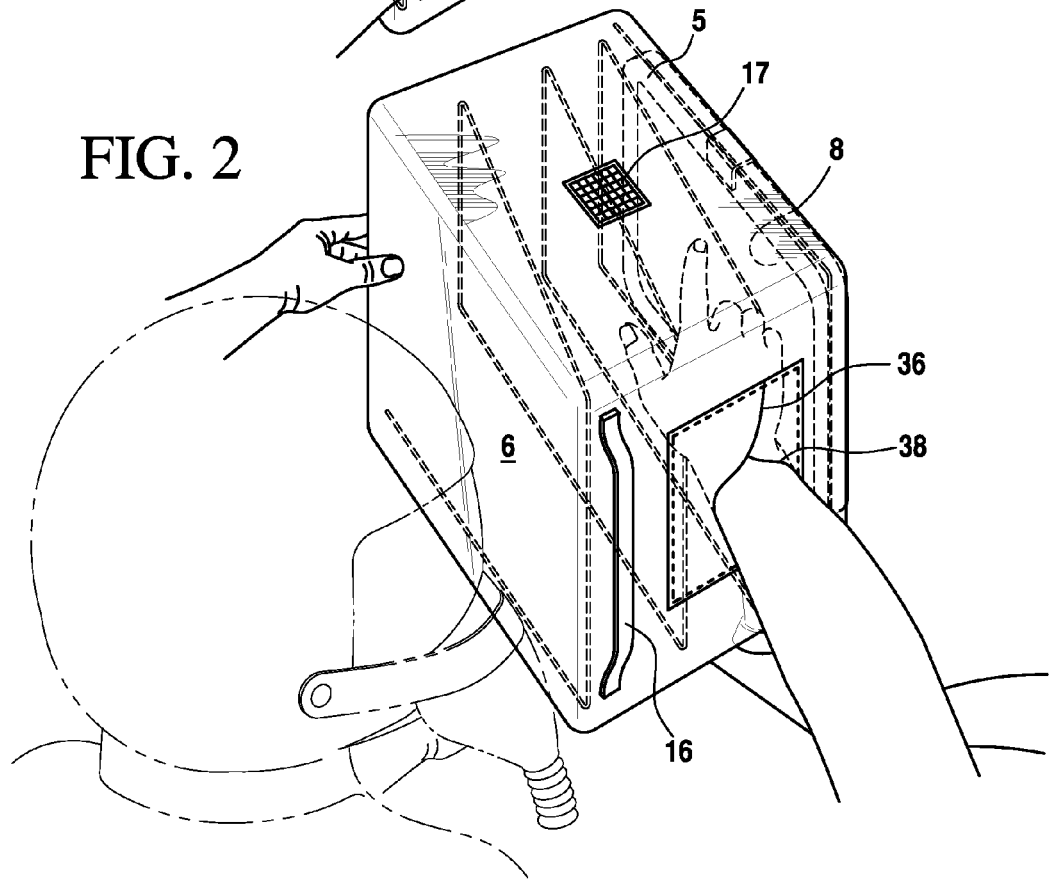
FIG. 2 is a perspective view of the apparatus of FIG. 1, showing a user's hand inserted inside the apparatus through a closable opening to operate a touch sensitive screen of a tablet PC disposed outside the apparatus.
Figure 3:
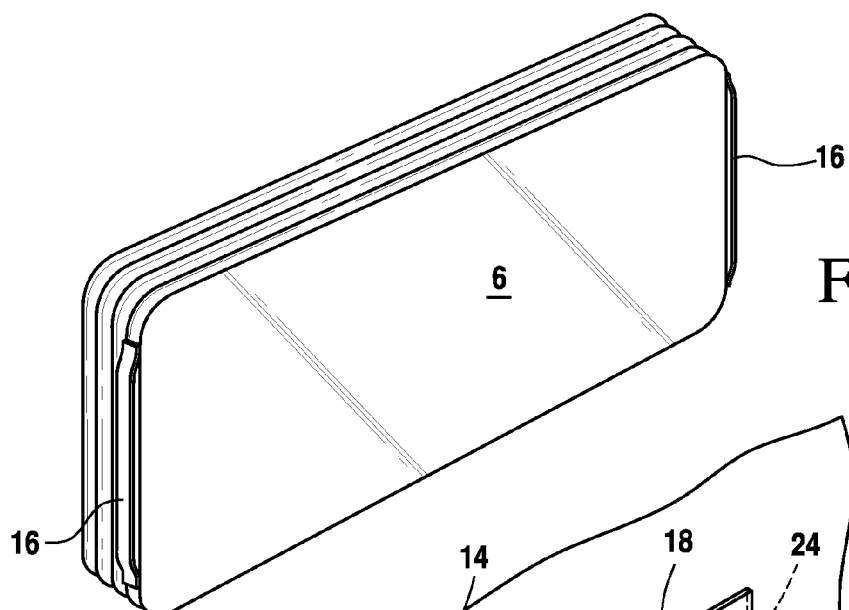
FIG. 3 is a perspective view of the apparatus of FIG. 1, shown in the deflated form.

An emergency vision apparatus 2 embodying the present invention is disclosed in FIGS. 1, 2 and 3. The apparatus 2 includes an inflatable enclosure 4 made of air tight material 5, which is foldable and pliable and having an expanded form when deployed, as shown in FIGS. 1 and 2, and a deflated form when not in use, as shown in FIG. 3. The material 5 may be made of foldable and pliable plastic fabric or other similar materials. The enclosure 4 has opposing deformable and pliable clear members 6 and 8 to enable a user to see through the clear member 6 and observe a source of information in front of the clear member 8 during a smoke emergency when there is vision-obscuring smoke or other particular matter in the environment. A tablet PC 10, such as the an APPLE IPAD (registered trademark) PC, is shown as an example of a source of information, removably supported by a stand 11. The tablet PC 10 may also be a dedicated reader, such as the AMAZON KINDLE (registered trademark) device or other similar devices. The tablet PC 10 may contain information normally carried inside a pilot's flight bag. Other sources of information may include hardware, such as a toggle switch, selector knob, etc.

The enclosure 4 has a closable opening 12 configured to allow a user's hand to be inserted inside the enclosure and to operate touch sensitive areas on the tablet PC 10, as shown in FIG. 2, or switches. A sealable closure 14, as will be described below, allows for the automatic opening and closing of the opening 12.

The apparatus 2 may be self-inflatable from the deflated form by means of a spring 15 that is biased to expand the enclosure 4 when the spring 15 is released from its compressed state. This arrangement makes the enclosure self-expandable. A filter 17 filters ambient air to fill the enclosure 4 as it expands from the action of the spring 15. The sides of the enclosure 4 may also be made of conventional pleated plastic material that when expanded by hand will stay expanded. Example of a self-inflatable apparatus 2 is disclosed in U.S. Pat. No. 6,460,804 and Publication Nos. WO 2009/082480 and WO 2009/137250, which are hereby incorporated by reference. The apparatus 2 may also be inflated by means of pressurized gas from a cylinder, as shown in U.S. Pat. No. 7,583,455.

The apparatus 2 may include handles 16 disposed at opposite ends of the enclosure 4 (the other handle is hidden from view).

Figure 4:
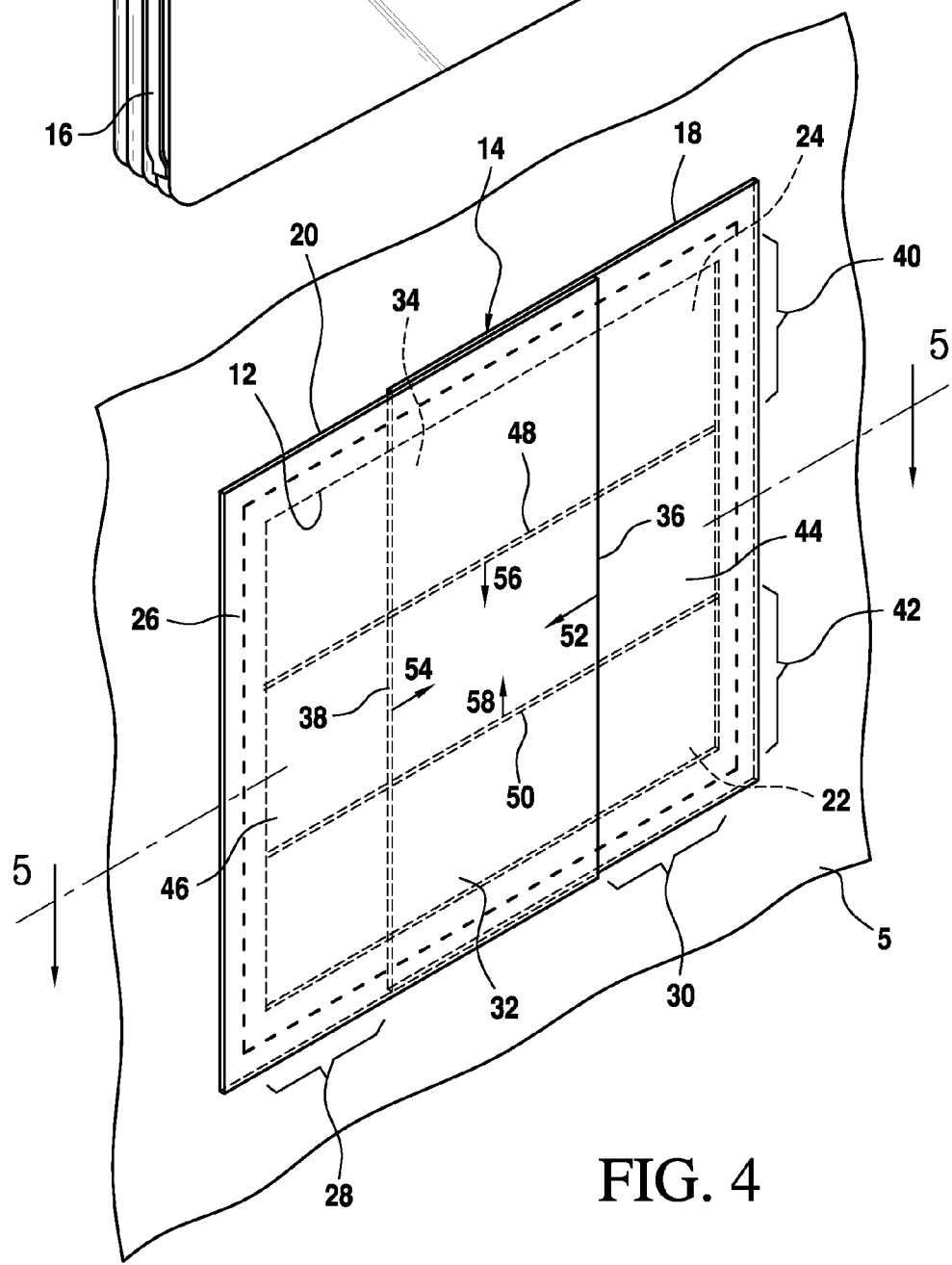
FIG. 4 is an enlarged perspective view of a sealable closure embodying the present invention.
Figure 5:
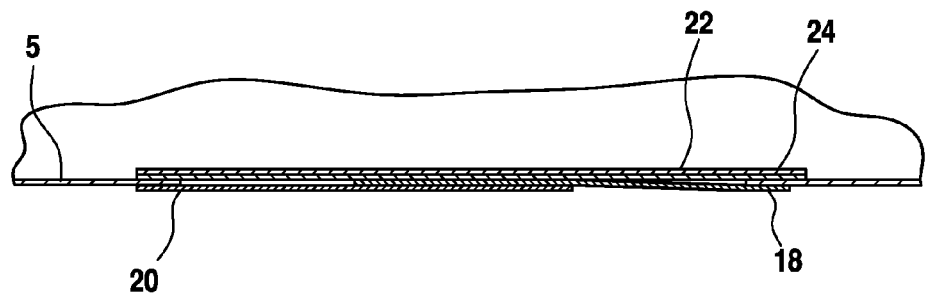
FIG. 5 is a cross section of view taken along line 5-5 in FIG. 4.
Figure 6:
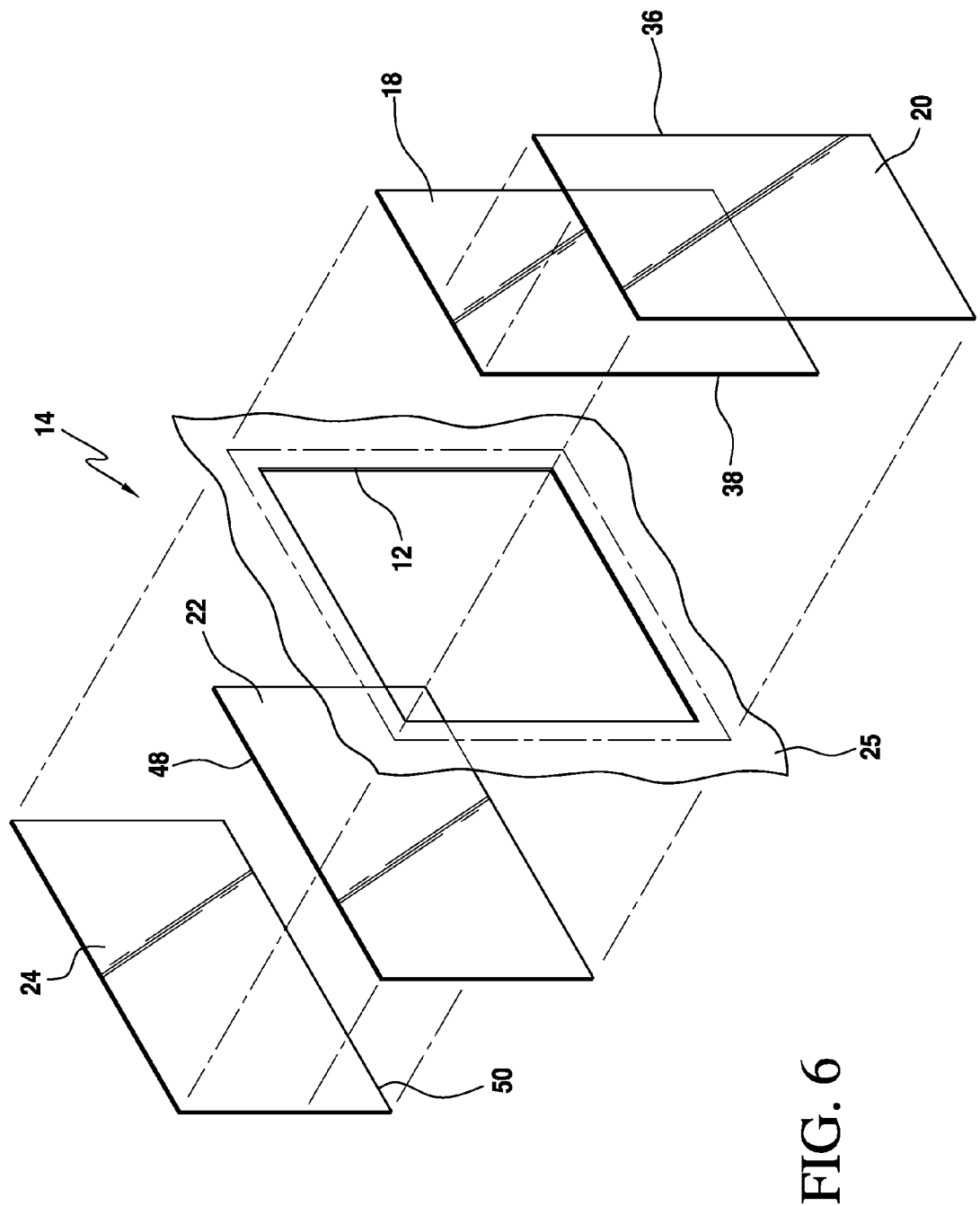
FIG. 6 is an assembly view of the sealable closure of FIG. 4.

Referring to FIGS. 4, 5 and 6, the closure 14 will now be described in detail. Closure 14 comprises a plurality of overlapping elastic sheets 18, 20, 22 and 24. The sheets 18-24 are attached to the material 5 adjacent to the periphery of the opening 12 by stitching 26 or other standard means. Preferably, the sheets 18 and 20 are attached to one side material and the sheets 22 and 26 are attached on the other side of the material, as shown in FIG. 5.

The sheet 18 is placed over the opening 12 so that a portion 28 of the opening 12 is not covered. Sheet 20 is placed across from the sheet 18 and over the opening 12 so that it covers the uncovered portion 28 but leaves a portion 30 of the opening not covered by the sheet 20. This arrangement allows the sheets 18 and 20 to have overlapping portions 32 and 34 disposed substantially across the center portion of the opening 12. The sheets 18 and 20 have respective edges 36 and 38 that define the extent of the overlapping portions 32 and 34 and are preferably parallel to each other.

The sheet 22 is placed over the opening 12 so that a portion 40 of the opening 12 is not covered by the sheet 22. The sheet 24 is placed across from the sheet 22 to cover the portion 40 of the opening 12 not covered by the sheet 22, but leaves a portion 42 not covered by the sheet 24. This arrangement provides overlapping portions 44 and 46 preferably disposed across the center portion of the opening 12. The sheets 22 and 24 have respective edges 48 and 50 that are preferably parallel to each other and define the extent of the overlap. The overlapping portions are preferably disposed transverse to the overlapping portions 32 and 34. The sheets 18-24 are preferably made of rubber material or other materials that are stretchable and flexible that provide an effective barrier to the opening 12 and to provide a seal around the user's arm when inserted through the opening 12.

Figure 7:
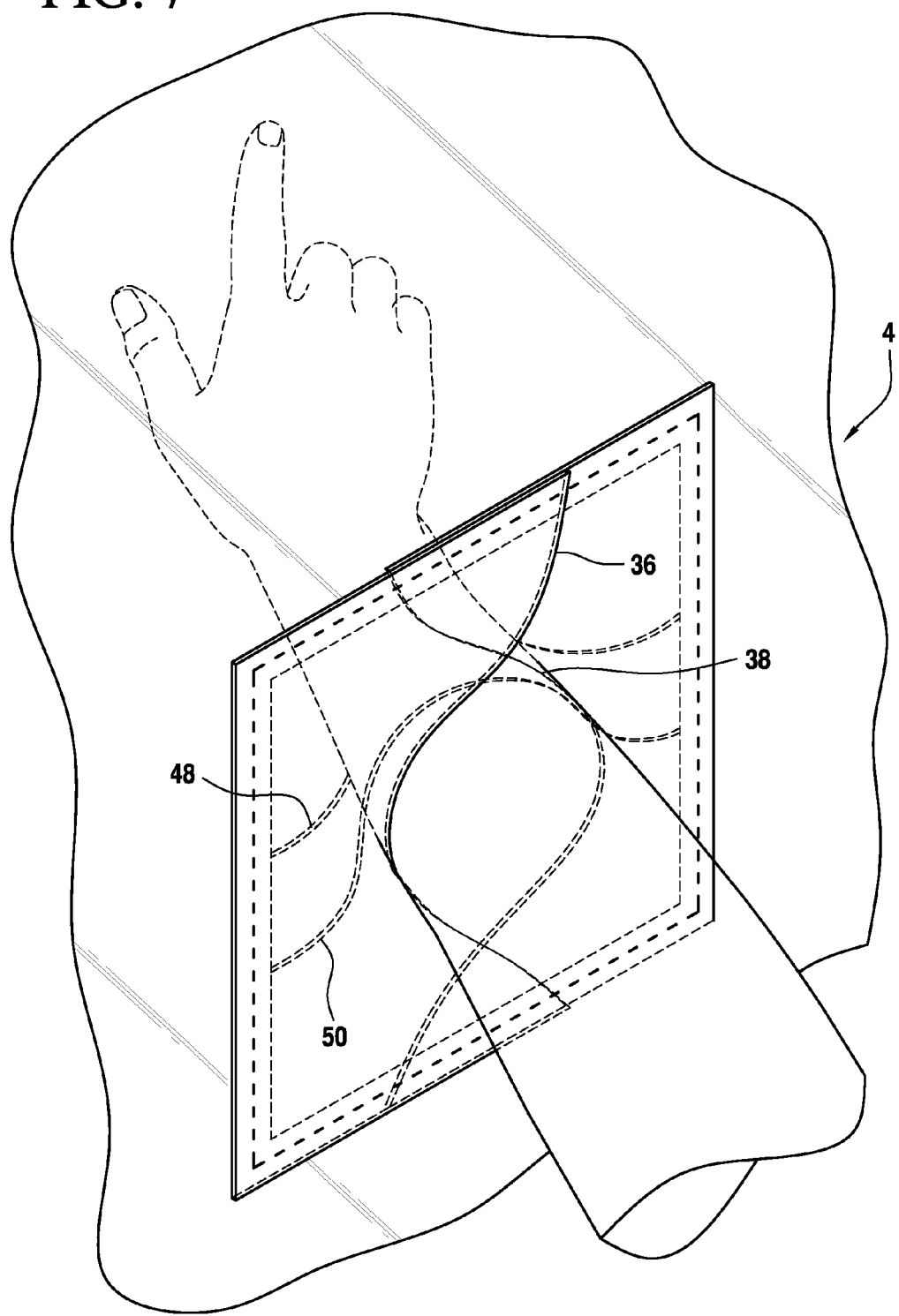
FIG. 7 is a perspective view of the sealable closure of FIG. 4, showing a hand inserted through the opening.

Referring to FIG. 4, to insert the user's arm, the edge 36 is stretched in the direction 52, the edge 38 in the opposite direction 54, the edge 50 in the direction 56 and the edge 48 in the opposite direction 58, thereby creating an opening for the arm to go through. The stretched edges try to go back to their original position, thereby creating a seal around the arm of the user to reduce the escape of gas from within the enclosure 4, as shown in FIG. 7. When the arm is removed from the opening 12, the stretched sheets 18-24 revert back to their original position to seal the opening 12. When the enclosure 4 is inflated, creating positive pressure inside the enclosure 4, an underlying sheet will push out against an overlying sheet, thereby creating a seal over the overlapping portions to reduce the escape of gas from inside the enclosure 4. The multiple overlapping portions advantageously increase the sealing power of the closure 14.

An assembly view of the closure 14 is disclosed in FIG. 6. The edges 48 and 50 are preferably oriented transverse to the edges 36 and 38. The sealing around the arm of the user is illustrated in FIGS. 2 and 6. As can be in seen FIG. 6, the edges 36, 38, 48 and 50 and the areas adjacent thereto due to their elasticity press against the arm to form a seal.

Figure 8:
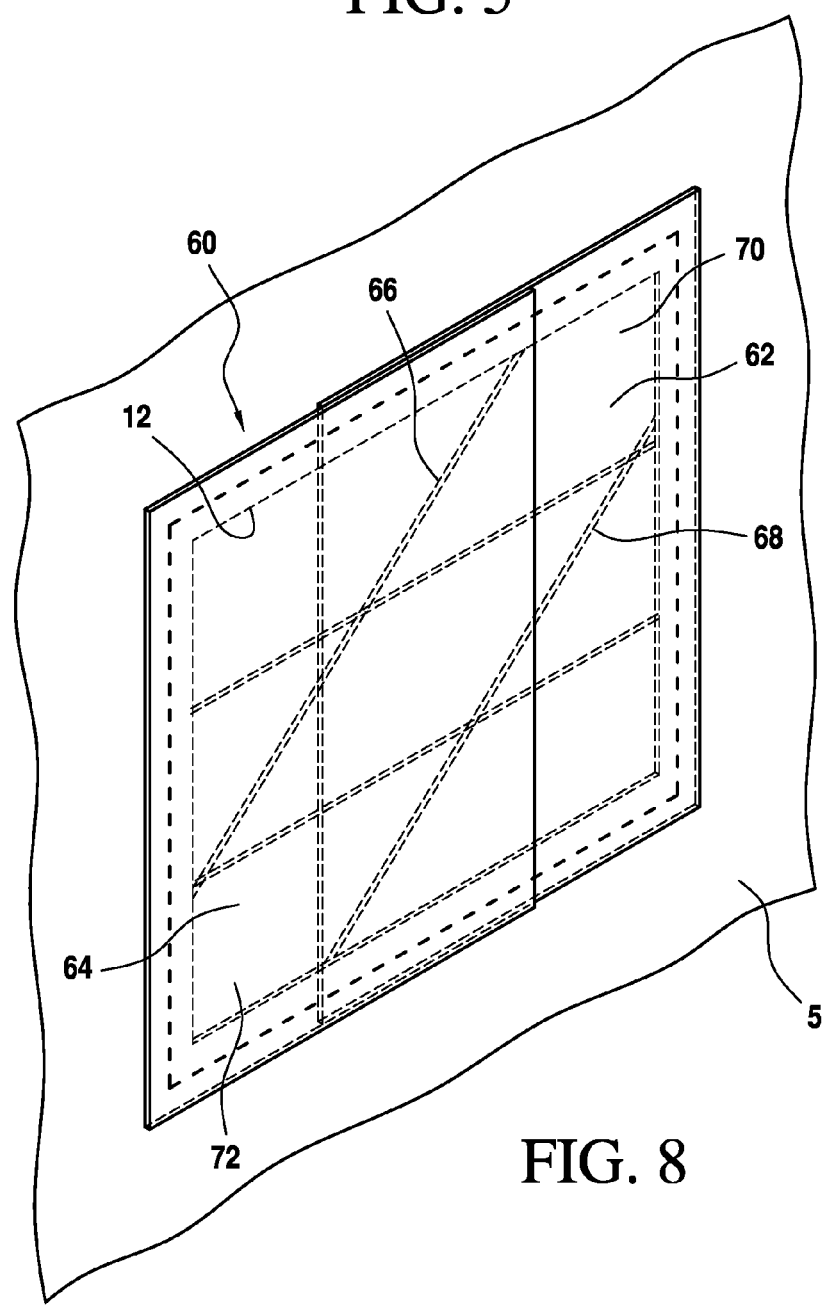
FIG. 8 is an enlarged perspective of another embodiment of a sealable closure embodying the present invention.
Figure 9:
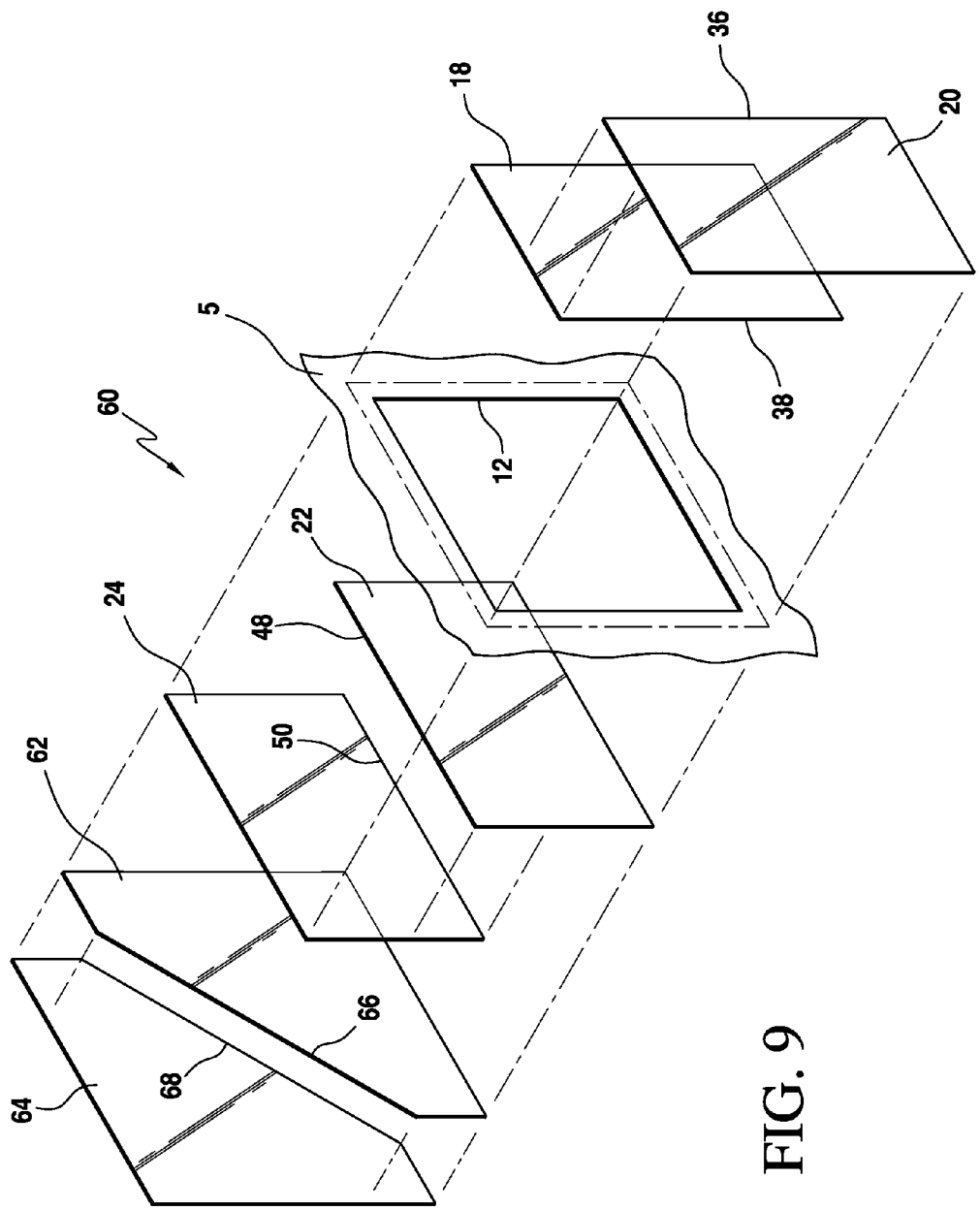
FIG. 9 is an assembly view of the sealable closure shown in FIG. 8.

Referring to FIGS. 8 and 9, another embodiment of a closure 60 is disclosed. The closure 60 is identical to the closure 12, but with the addition of two overlapping sheets 62 and 64 with edges 68 that are oriented preferably diagonally relative to the edges 36, 38 and 48-50. As in the closure 14, the closure 60 has the sheets 62 and 64 with portions 70 and 72 overlapping across the opening 12. The sheets 62 and 64 provide additional sealing edges 66 and 68 when the arm is inserted into the opening 12. Further, the overlapping portions 70 and 72 advantageously provide additional resistance against air flow to minimize escape of gas inside the enclosure 4. The edges 66 and 68 are preferably parallel to each other. The sheets 62 and 64 are preferably disposed over the sheets 22 and 24. The sheets 62 and 64 are preferably made of rubber material or other materials that are stretchable and flexible that provide an effective barrier to the opening 12 and to provide a seal around the user's arm when inserted through the opening 12.

Figure 10:
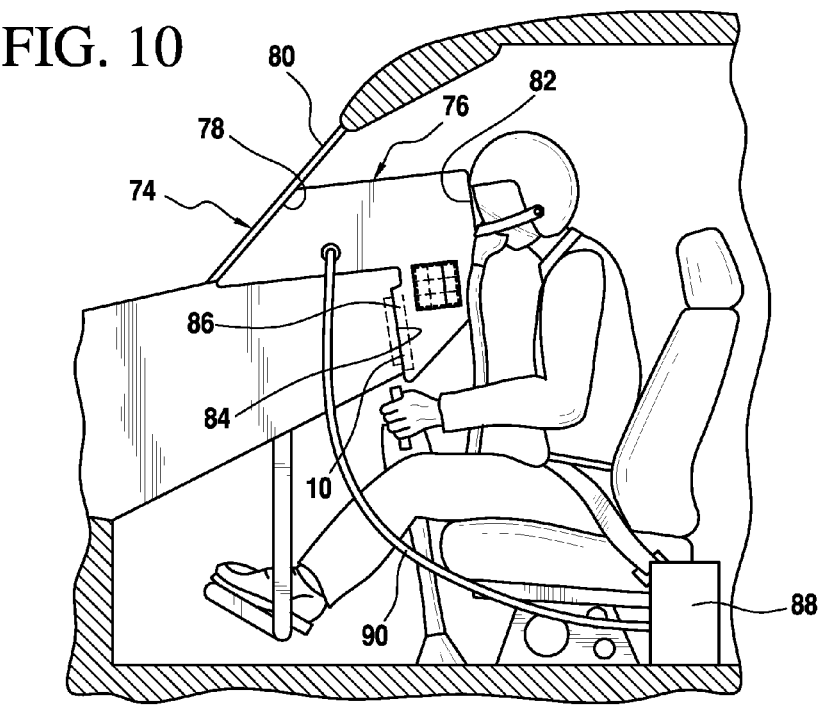
FIG. 10 is a side elevation of view of another embodiment of an emergency vision apparatus embodying the present invention.
Figure 11:
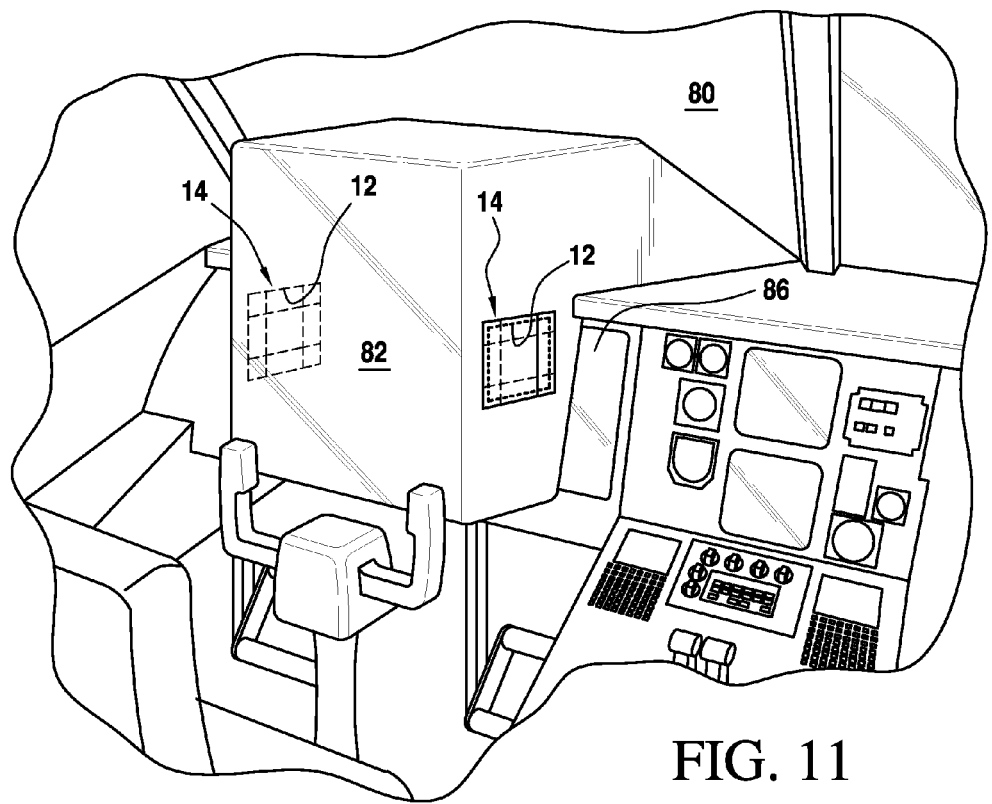
FIG. 11 is a perspective view of the emergency vision apparatus of FIG. 10.
Figure 12:
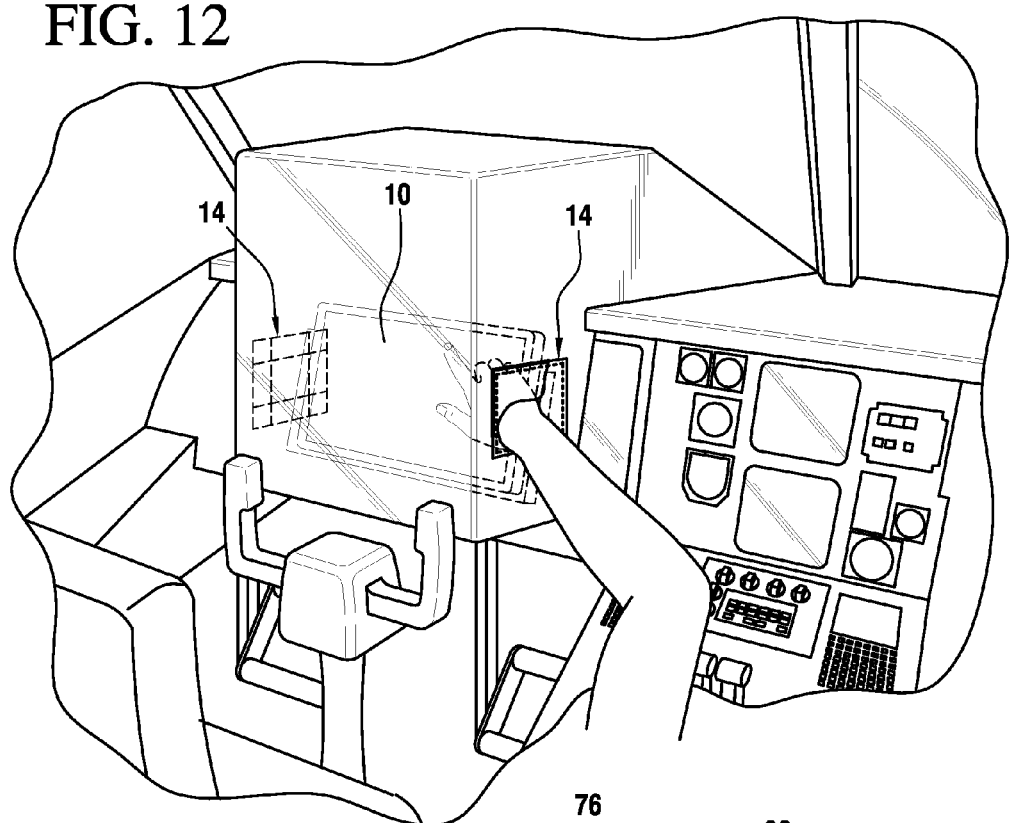
FIG. 12 is a perspective view of the apparatus of FIG. 10, showing a hand inserted into a closable opening.
Figure 14:
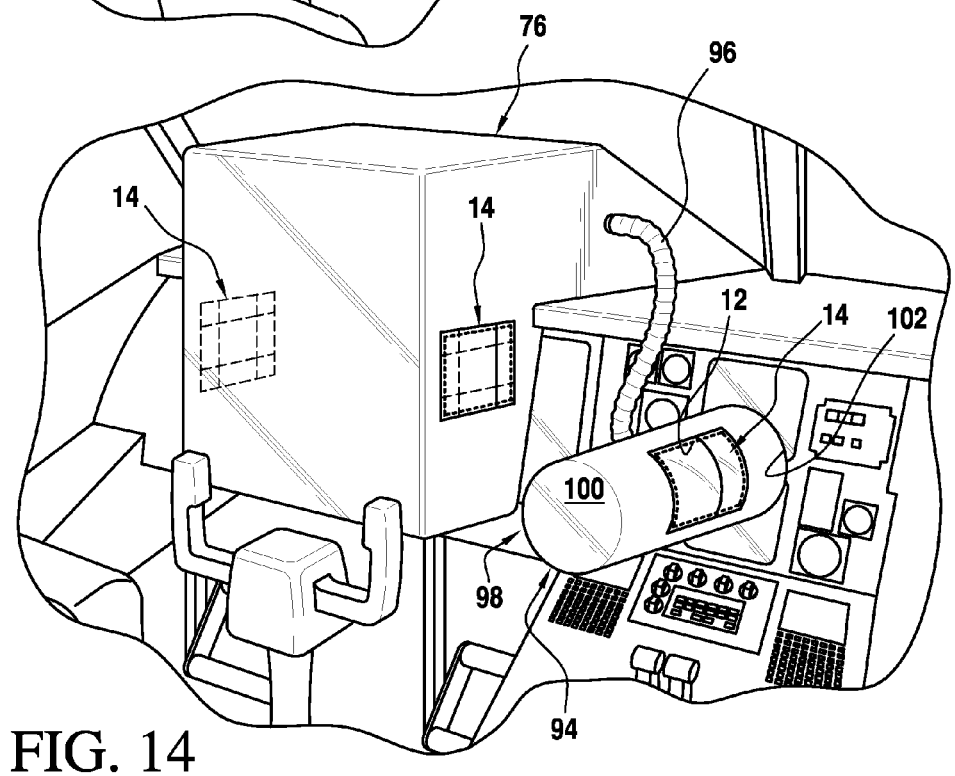
FIG. 14 is a perspective view of the apparatus of FIG. 10, showing a handheld emergency vision apparatus inflated through a hose connected to the emergency vision apparatus of FIG. 10.

Another embodiment of an emergency vision apparatus 74 is disclosed in FIGS. 10, 11 and 12. The apparatus 74 includes an inflatable enclosure 76 as disclosed in U.S. Pat. No. 6,082,673, herein incorporated by reference. The inflatable enclosure 76 has an inflated form during use and a deflated form for storage when not in use. The inflatable enclosure 76 is constructed of an air tight material, which is foldable and pliable. The inflatable enclosure 76 includes a clear member 78 for placement against a windshield 80 of an airplane cockpit. The enclosure 76 further includes another clear member 82 opposite the clear member 78 to allow the user to see through the enclosure and observe the source of information outside windshield 80. The enclosure 76 also includes another clear member 84 that allows the user to observe information provided by an instrument panel 86.

A blower inside a housing 88 is operably connected to the enclosure 76 with a hose 90. The blower inflates the enclosure 76 from a deflated folded form and maintains the enclosure 76 inflated during use. A filter (not shown) is disposed within the blower 88 to filter the particulate matter from within the cockpit during a smoke emergency so that clear air is pumped into the interior of the enclosure 76. The enclosure 76 when not in use is deflated and stored inside the housing 88 along with the hose 90.

Figure 13:
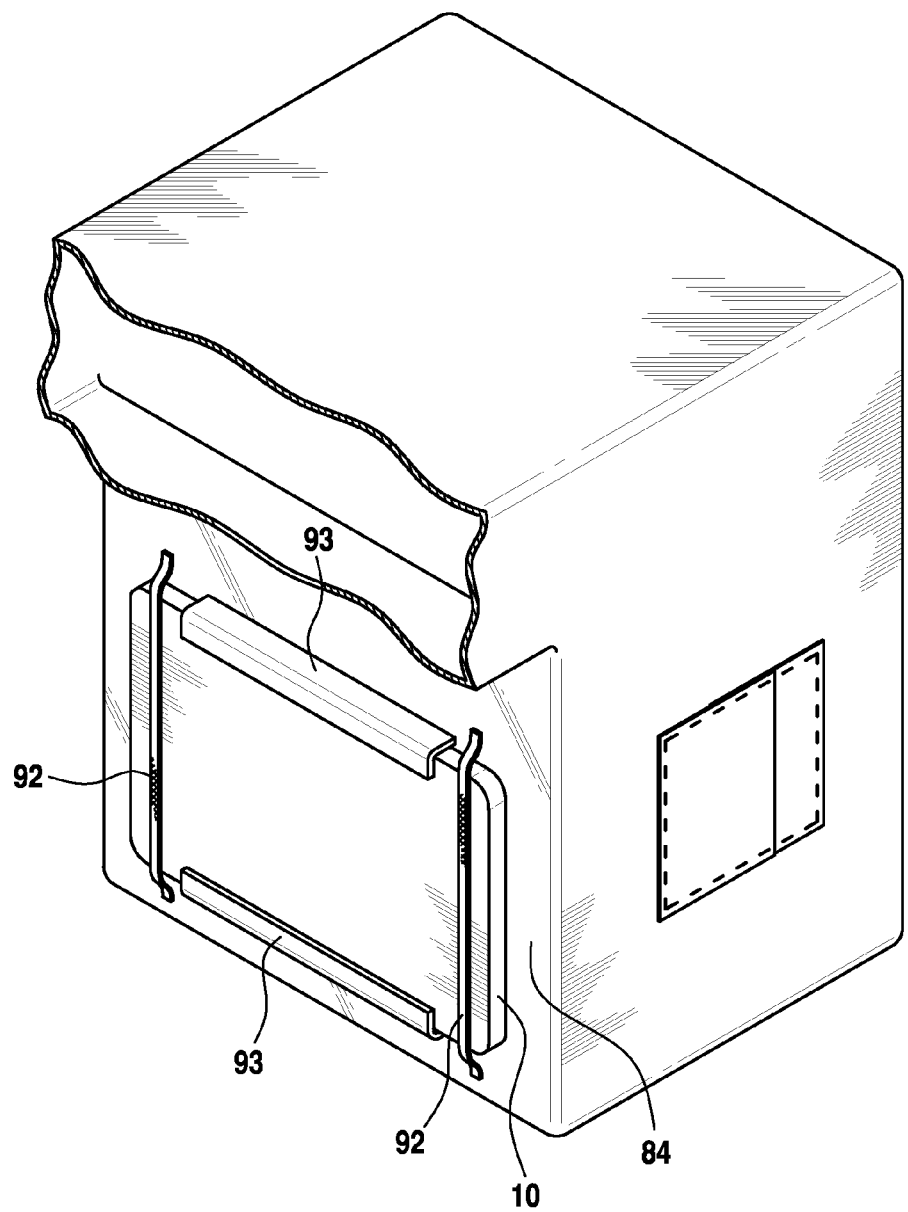
FIG. 13 is a perspective view of a tablet PC attached in front of a clear member of the apparatus of FIG. 10.

The enclosure 76 includes the closable openings 12 with respective sealable closures 14 or 60 to allow the user to manipulate touch sensitive portions of the instrument panel 86 or the tablet PC 10 which may be placed between the instrument panel and the clear member 84, as shown in FIG. 13. Holding straps 92 and guideways 93 or other standard means may be used to hold the tablet PC 10 in front of the clear member 84, as shown in FIG. 13.

A handheld emergency vision apparatus 94 may be attached to the enclosure 76. The apparatus 94 is similar to the device disclosed in U.S. Pat. No. 6,460,804, hereby incorporated by reference, but without the spring that biases the device in the open position. The apparatus 94 has an inflatable enclosure 98 with clear members 100 and 102 to allow the user to look through the enclosure and observe the source of information at the far end of the enclosure. The enclosure 98 is attached with a hose 96 to the enclosure 76 for inflation of the enclosure 98 from its deflated form. The enclosure 98 is deflated and stored when not in use. The enclosure 98 may be constructed of the same materials as the enclosure 4. The enclosure 98 may be moved around as needed to observe various areas of the instrument panel. The enclosure 98 is provided with the closable opening 12 with the sealable closure 14 or 60, as described above, to allow the user to manipulate touch sensitive displays or switches.

It should be understood that the closable opening 12 and the sealable closure 14 may be incorporated in any emergency vision apparatus employing an inflatable enclosure of the type that allows a user to see through the enclosure to observe a source of information at the far end of the enclosure during a smoke emergency that impairs the vision of an operator in control station.

Although the present invention has been described in the environment of an aircraft cockpit, it should be understood that it would be equally applicable to other settings, such as in a submarine control station, a nuclear power plant control room or any other environments where the need exists for an operator to continue to operate in case of smoke in the room that obliterates the visibility between the operator and the control panel. For example, the instrument or control panel may be disposed in an operator station within a control room in a submarine, nuclear power plant, or other critical areas. In this case, to continue to operate, the operator must have visual access to the instrument or control panel in case smoke invades the operator station. In addition, the need to operate hardware, such as switches, touch sensitive displays, knobs, etc. while smoke is in the environment is addressed by the closable opening and sealable closure described in the present invention.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. An emergency vision apparatus, comprising:
   a) an inflatable first enclosure, said first enclosure being made of airtight material and having an expanded form when deployed and a deflated form when not in use;
   b) first and second clear members disposed at respective first and second ends of said first enclosure to enable a user to see through said first enclosure when expanded and observe a source of information at a distal end of said first enclosure while smoke or other particulate matter is in the environment;
   c) said first enclosure including an opening configured to allow a user to operate a touch sensitive screen or hardware visible through said first enclosure when the user's hand is inserted through said opening;
   d) a sealable closure for closing said opening and sealing said opening around the user's arm to reduce gas from escaping from within said first enclosure;
   e) said closure including an elastic first sheet partly covering said opening, leaving an uncovered portion;
   f) said first sheet including a first edge disposed over said opening;
   g) an elastic second sheet disposed over said uncovered portion, said second sheet including a first portion overlapping said first sheet, said first portion including a second edge; and
   h) said first and second edges are oriented in substantially the same direction.

2. An emergency vision apparatus as in claim 1, wherein said elastic first and second sheets are foldable with said first enclosure when in said deflated form.

3. An emergency vision apparatus as in claim 1, wherein:
   a) said closure includes an elastic third sheet partly overlying said opening, leaving a second portion of the opening not underneath said third sheet, said third sheet including a third edge;
   b) an elastic fourth sheet overlying said second portion of said opening, said fourth sheet including a second portion overlapping said third sheet, said portion including a fourth edge;
   c) said third and fourth edges are oriented in substantially the same direction; and
   d) said third and fourth edges are transverse to said first and second edges.

4. An emergency vision apparatus as in claim 3, wherein:
   a) said closure includes an elastic fifth sheet partly overlying said opening, leaving a third portion of said opening not underneath said fifth sheet;
   b) said fifth sheet including a fifth edge disposed over said opening;
   c) an elastic sixth sheet disposed over said third portion of said opening, said sixth sheet including a third portion overlapping said fifth sheet, said third portion including a sixth edge;
   d) said fifth and sixth edges are oriented in substantially the same direction; and
   e) said fifth and sixth edges are slanted to said first and second edges and said third and fourth edges.

5. An emergency vision apparatus as in claim 4, wherein said fifth and sixth edges are parallel to each other.

6. An emergency vision apparatus as in claim 3, wherein said third and fourth edges are parallel to each other.

7. An emergency vision apparatus as in claim 1, wherein said first and second edges are parallel to each other.

8. An emergency vision apparatus as in claim 1, wherein said inflatable first enclosure is hand-held.

9. An emergency vision apparatus as in claim 1, wherein said inflatable first enclosure is self-expandable.

10. An emergency vision apparatus as in claim 1, and further comprising a blower operably associated with said inflatable first enclosure for inflating said first enclosure from a deflated form.

11. An emergency vision apparatus as in claim 10, and further comprising:
    a) an inflatable second enclosure, said second enclosure being made of airtight material and having an expanded form when deployed and a deflated form when not in use;
    b) first and second clear members disposed at respective first and second ends of said second enclosure to enable a user to see through said second enclosure when expanded and observe a source of information at a distal end of said second enclosure while smoke or other particulate matter is in the environment;
    c) said second enclosure including an opening configured for insertion of a user's hand to allow the user to operate a touch sensitive screen or hardware disposed in front of said first clear member of said second enclosure;
    d) a closure for closing said opening of said second enclosure and sealing said opening of said second enclosure around the user's arm; and
    e) hose operably connected between said second enclosure and said first enclosure for conveying inflating gas from said first enclosure to said second enclosure to inflate said second enclosure.

\* \* \* \* \*